United States Patent
Gerig

(10) Patent No.: US 7,394,390 B2
(45) Date of Patent: *Jul. 1, 2008

(54) RECEIVER COLLAR

(75) Inventor: Duane A. Gerig, Fort Wayne, IN (US)

(73) Assignee: Radio Systems Corporation, Knoxville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 11/679,328

(22) Filed: Feb. 27, 2007

(65) Prior Publication Data

US 2007/0137589 A1   Jun. 21, 2007

Related U.S. Application Data

(62) Division of application No. 11/337,193, filed on Jan. 20, 2006.

(60) Provisional application No. 60/648,178, filed on Jan. 28, 2005.

(51) Int. Cl.
*G08B 23/00* (2006.01)

(52) U.S. Cl. .............................. 340/573.3; 340/639.19; 119/721

(58) Field of Classification Search ............... 340/573.3
See application file for complete search history.

(56) References Cited

U.S. PATENT DOCUMENTS

| | | | | |
|---|---|---|---|---|
| 6,003,473 A | * | 12/1999 | Printz | ..................... 119/859 |
| 6,079,367 A | * | 6/2000 | Stapelfeld et al. | ........... 119/720 |
| 6,431,122 B1 | * | 8/2002 | Westrick et al. | ............. 119/721 |
| 6,838,991 B2 | * | 1/2005 | Frankewich, Jr. | ........ 340/573.1 |
| 2002/0036569 A1 | * | 3/2002 | Martin | .................... 340/573.1 |
| 2003/0121480 A1 | * | 7/2003 | Grimsley et al. | ............ 119/721 |
| 2004/0021574 A1 | * | 2/2004 | Frankewich, Jr. | ........ 340/573.3 |
| 2006/0169222 A1 | * | 8/2006 | Gerig | ........................ 119/859 |

* cited by examiner

*Primary Examiner*—George A Bugg
(74) *Attorney, Agent, or Firm*—Pitts & Brittian

(57) ABSTRACT

An animal collar system including an animal collar, a housing mounted to the animal collar and an electrical circuit. The electrical circuit is enclosed in the housing and a built-in-test circuit is electrically connected to the electrical circuit.

12 Claims, 5 Drawing Sheets

RECEIVER COLLAR

CROSS REFERENCE TO RELATED APPLICATIONS

This is a division of U.S. patent application Ser. No. 11/337,193, entitled "RECEIVER COLLAR", filed Jan. 20, 2006. U.S. patent application Ser. No. 11/337,193 is a nonprovisional application based upon U.S. provisional patent application Ser. No. 60/648,178, entitled "SYSTEM BUILT IN TEST FOR ANIMAL CORRECTION RECEIVER COLLARS", filed Jan. 28, 2005.

BACKGROUND OF THE INVENTION

1. Field of the Invention

The present invention relates to an animal collar system, and, more particularly to an animal collar system including a receiver for the modification of animal behavior.

2. Description of the Related Art

Stimulation devices are used for the modification of behavior of an animal. The stimulation device is often associated with a collar worn by the animal and is provided to improve the behavior of the animal. Some stimulation devices include twin electrodes that are positioned against the skin of an animal, which delivers an electrical stimulus to modify the behavior of the animal. The stimulus can also be in the form of a vibration, an audible tone or noise, or other sensory stimulation to gain the attention of the animal. The actual functioning of the collar system can be determined by activating the collar while on the animal, which may have an unintended consequence by applying a stimulus at an inappropriate time. Another way of testing the animal collar is to disassemble the animal collar and connect it to test equipment. This approach is normally not feasible due to the time required to disassemble the collar, which is often hermetically sealed to prevent the entrance of moisture. Further, the testing of the animal collar utilizing test equipment would be at a considerable expense for the equipment and require a level of expertise that may not be available to a dog owner.

What is needed in the art is a animal collar which can be easily and cost effectively tested for functionality.

SUMMARY OF THE INVENTION

The present invention provides an animal collar system including circuits that perform a built-in-test (BIT) function.

The invention comprises, in one form thereof, an animal collar system including an animal collar, a housing mounted to the animal collar, an electrical circuit enclosed in the housing and a built-in-test circuit electrically connected to the electrical circuit.

An advantage of the present invention is that the electrical portions of the animal collar are easily tested.

Another advantage of the present invention is that the voltage level of the battery is checked during the testing.

Yet another advantage of the present invention is that the BIT circuitry utilizes some of the functional circuits to provide signals to test other portions of the circuitry.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
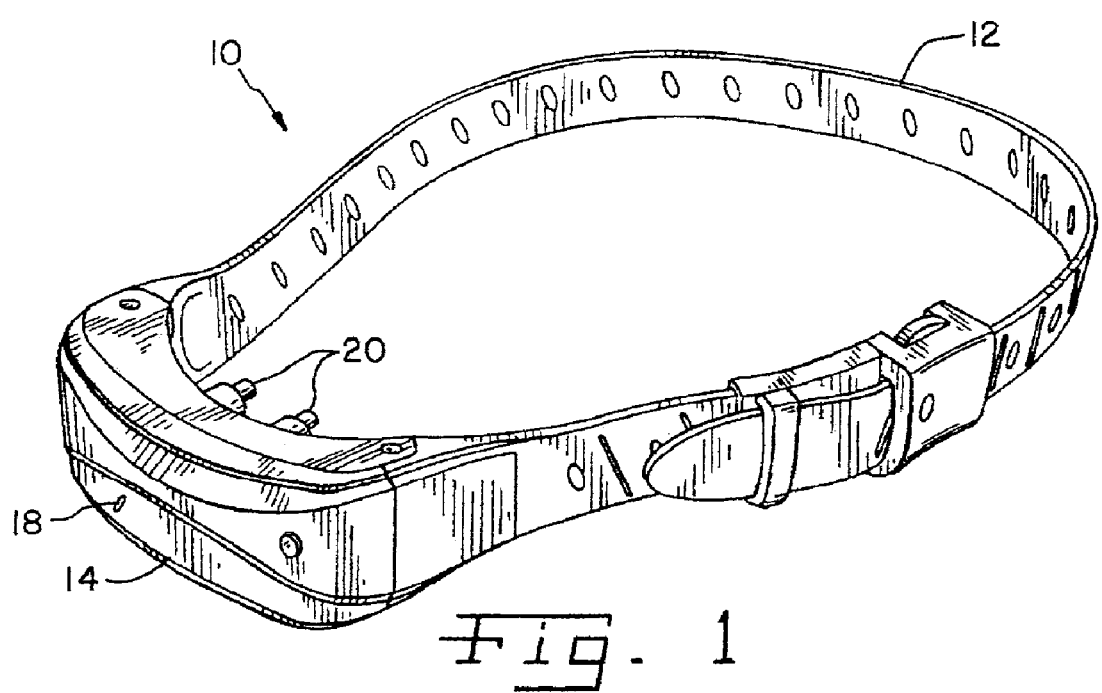
FIG. 1 is a perspective view of an embodiment of an animal collar system of the present invention.
Figure 2:
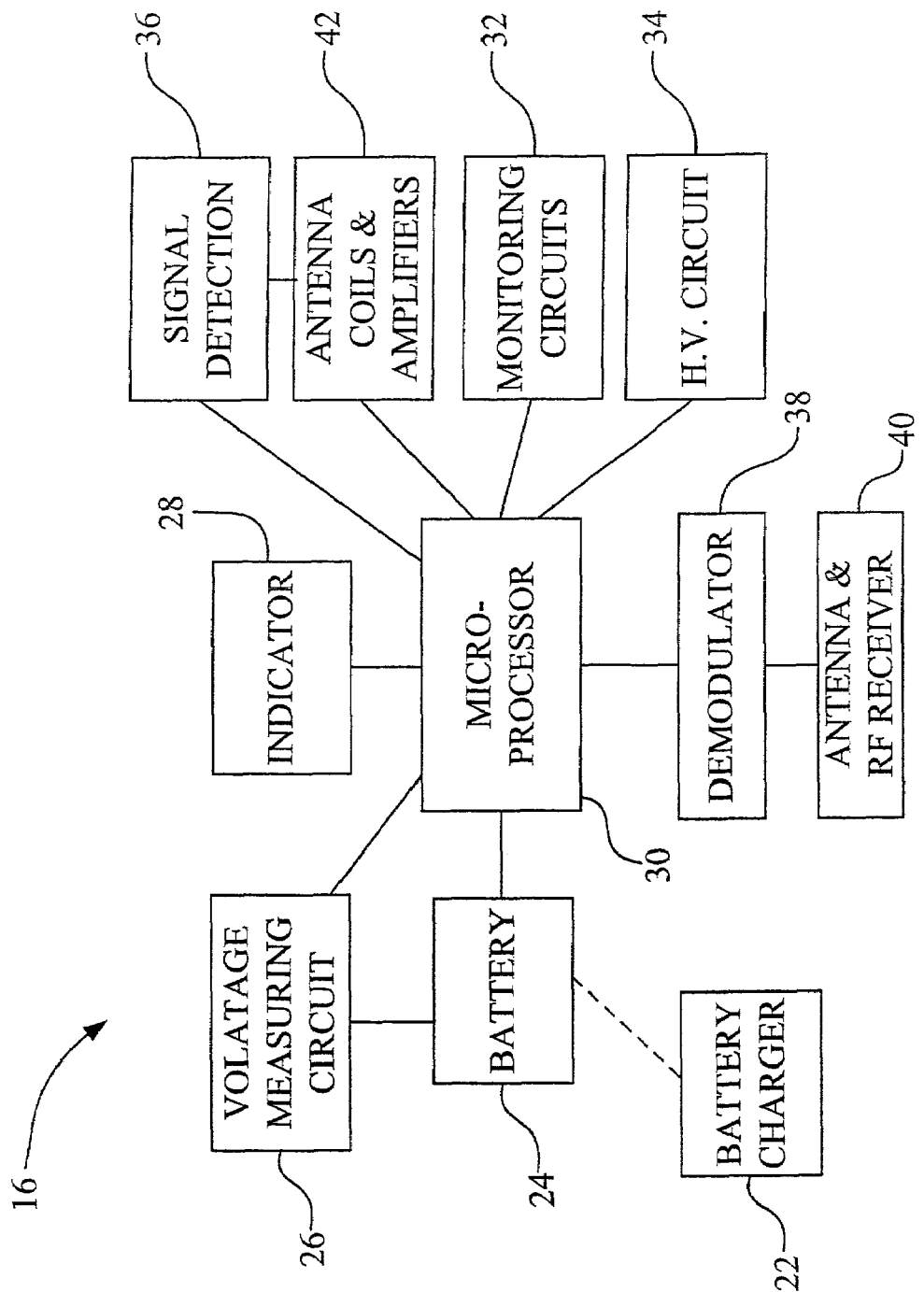
FIG. 2 illustrates, in a schematic form, functions of circuitry in and associated with the animal collar system of FIG. 1.

Referring now to the drawings, and more particularly to FIGS. 1 and 2, there is shown an embodiment of an animal collar system 10 including a collar 12, a housing 14, an electrical circuit assembly 16, a light emitting diode (LED) 18 connected to housing 14 and electrode probes 20 protrude from housing 14. Collar 12 is connected to housing 14 and is adjustable to fit the animal's neck. Housing 14 has an LED 18, which can be in the form of an indicator 18, attached to a portion of housing 14. Indicator 18 may be an audio and/or visual indicator. Housing 14 contains electrical circuit assembly 16, which is electrically connected to electrode probes 20 for the delivery of a stimulus to the neck of the animal that is in contact with electrode probes 20.

Electrical circuit assembly 16 is illustrated with a battery charger 22 that is intermittently connected to battery 24 in order to charge battery 24, which is schematically indicated by the dashed line of FIG. 2. Electrical circuit assembly 16 includes a voltage measuring circuit 26, an indicator circuit 28, a microprocessor 30, monitoring circuits 32, a high voltage (HV) circuit 34, signal detection circuitry 36, demodulator 38, antenna & RF receiver 40 and Antenna coils & amplifiers 42. Battery 24 is charged by way of battery charger 22 and a significant number of the circuits contained in electrical circuit assembly 16 may be deactivated while battery 24 is being charged. Voltage measuring circuit 26 measures the voltage of battery 24 when initiated by microprocessor 30. Microprocessor 30 also interfaces with indicator circuit 28 to provide an output by way of LED 18 or an audio signal on a speaker (not shown), which may be contained in housing 14. Microprocessor 30 is additionally connected a monitoring circuits 32, high voltage circuit 34, signal detection circuitry 36, demodulator 38, receiver 40 and antenna coils & amplifiers 42. While electrical circuit assembly 16 shows the functionality necessary to describe method 100 of FIGS. 3A-3C, additional functions may be included in the animal collar system, which are not shown in FIG. 2 for the sake of clarity.

Figure 3A:
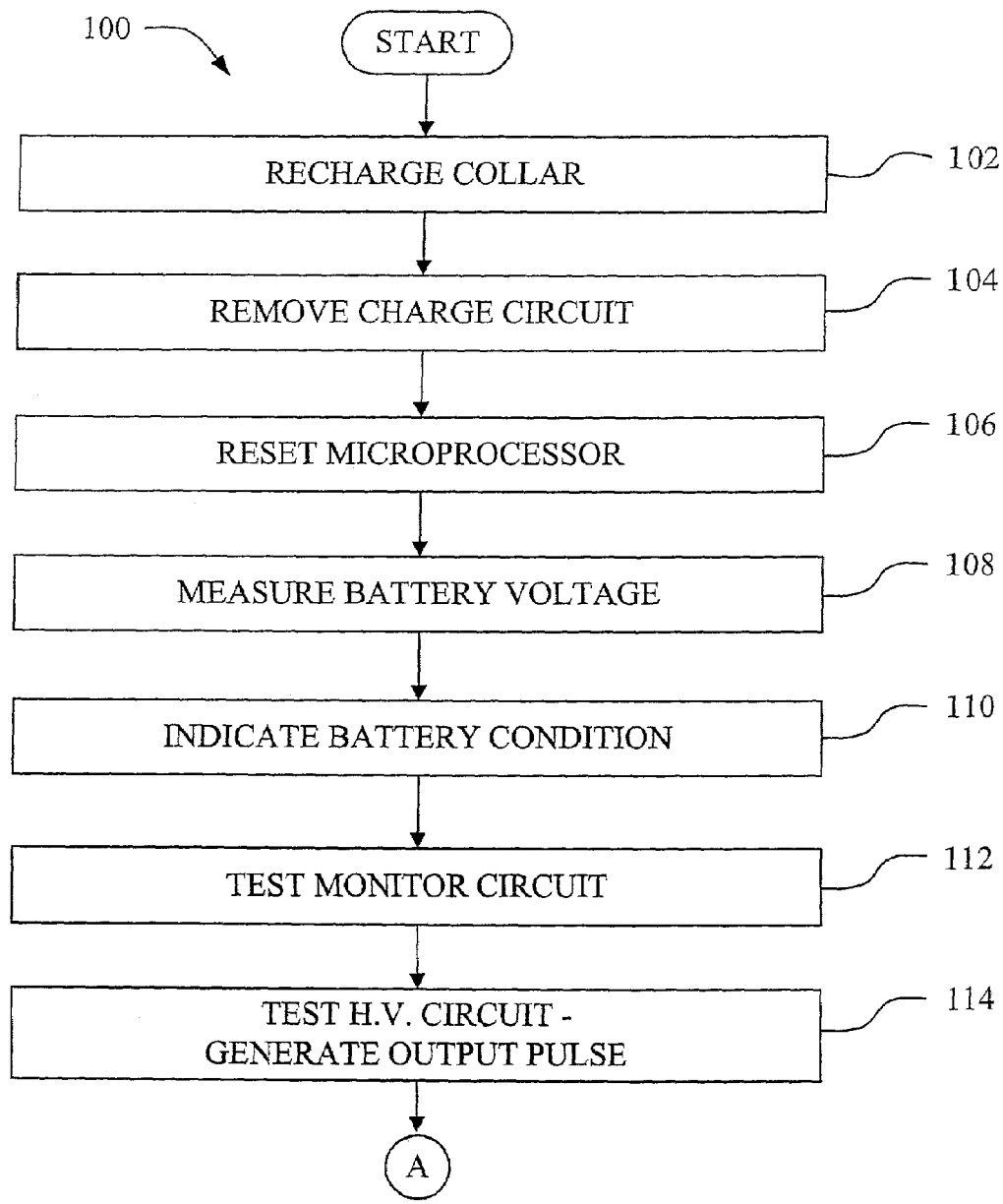
FIGS. 3A-3C illustrate a method of the operation of the circuitry of FIG. 2 in the animal collar system of FIG. 1.
Figure 3B:
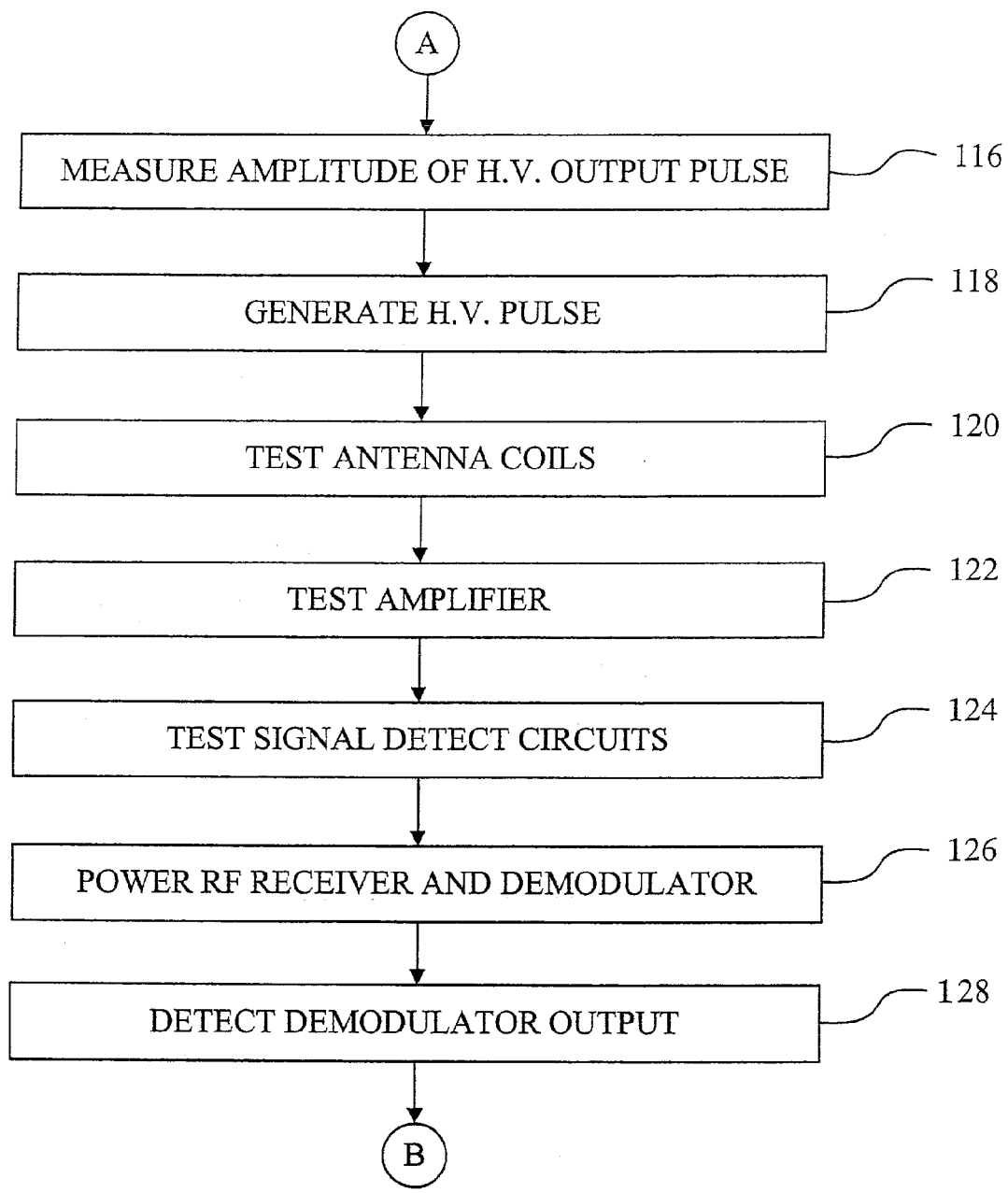
Figure 3C:
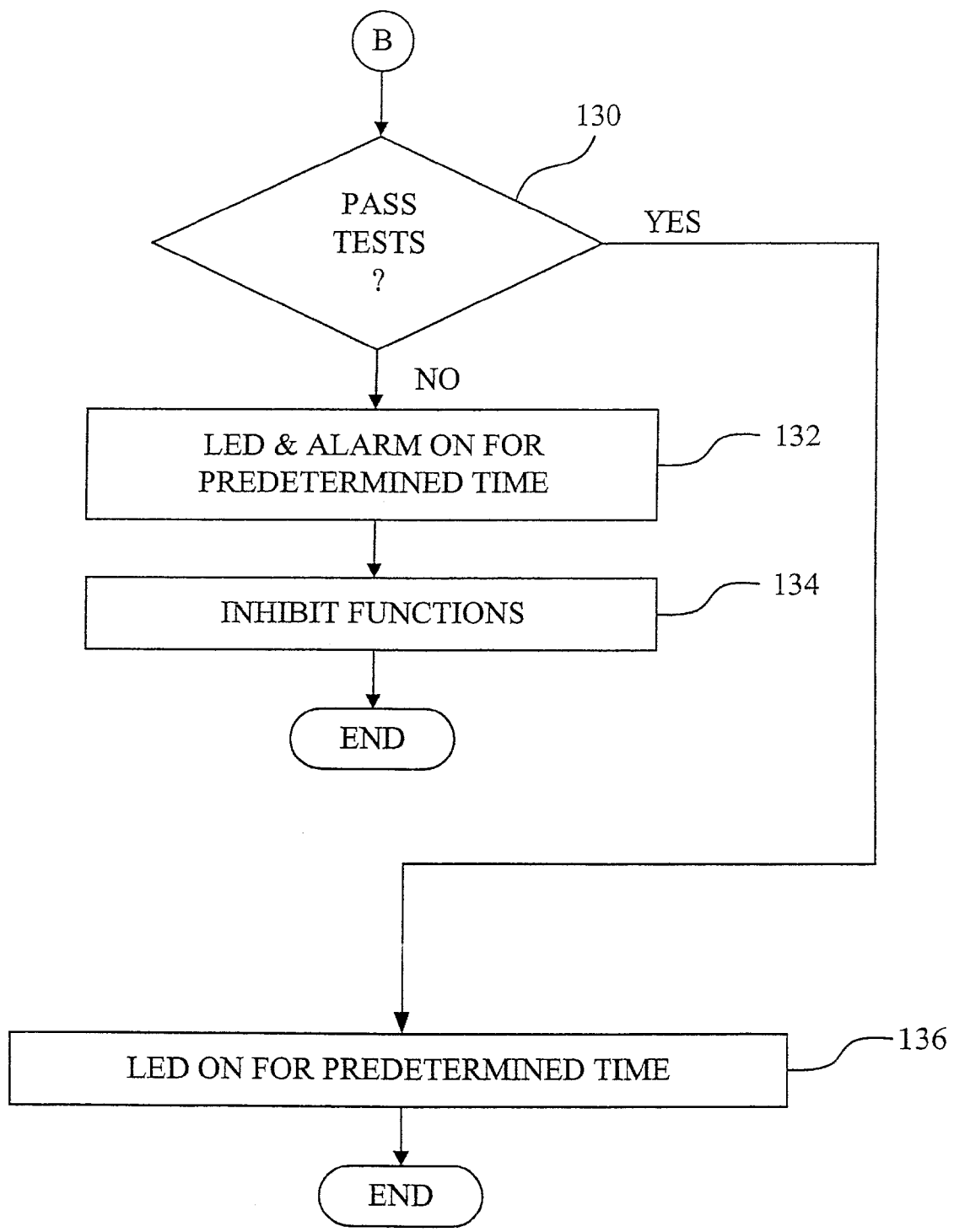

Now, additionally referring to FIGS. 3A-3C there is shown a method 100 for testing electrical circuit assembly 16. Method 100 is carried out by an algorithm used by microprocessor 30 and/or circuitry that carries out the steps of method 100. Although method 100 may be initiated in various ways, steps 102 and 104 depict the charging of battery 24 at step 102 and removal of the charging circuit at step 104, which initiates the testing by way of BIT circuits that are a part of electrical circuit assembly 16. At step 106, microprocessor 30 is reset causing it to reboot and initiate a series of tests of circuitry contained in electrical circuit assembly 16. Alternatively, the tests can be initiated in a number of ways, such as, by the application of power by way of battery charger 22, by a remote control signal, at specific time intervals and/or by the detection of specific operational events. The operational events, may be related to one or more of several events, such as, the detection of a boundary signal, a change in temperature, a specific orientation of collar system 10, a duration of a predetermined time since electrical activation of electrode probes 20, the changing of a battery in collar system 10 and/or an uncoupling or coupling of the buckle of collar 12. At step 108, microprocessor 30 activates voltage measuring circuit 26 to measure the voltage of battery 24 and to provide a value of the indicated voltage back to microprocessor 30. At step 110, microprocessor 30 sends a signal to indicator circuitry 28 to emit information relative to the battery voltage, such as an audible sound on a speaker or by indicating a voltage level by way of changing the color of LED 18. For example, if the value of the measured voltage is above a predetermined value, which relates to over 40% the capacity of battery 24 remaining, the color of LED 18 is green. If the battery capacity of battery 24 is between 20 and 40%, LED 18 outputs a yellow color. Further, if the battery capacity of battery 24 is below 20%, LED 18 outputs a red color.

At step 112, monitoring circuits 32 are tested by being activated by microprocessor 30. At step 114, microprocessor 30 causes an output pulse to be delivered to high voltage circuit 34 that drives a high voltage stimulation transformer (not shown). The instruction from microprocessor 30 causes the output pulse to correspond to a predetermined output amplitude. At step 116, microprocessor 30 causes the amplitude of the high voltage output pulse to be measured by a high voltage stimulation monitor circuit contained in monitoring circuits 32. The high voltage output pulse measurement must be within specified minimum/maximum limits to pass the BIT.

At step 118, microprocessor 30 generates information causing another high voltage pulse to be generated at step 118 of a predetermined output amplitude and duration. During the generation of this high voltage output pulse, microprocessor 30 monitors the output of containment signal detection circuits 36 for the presence of a signal pulse. If microprocessor 30 detects the presence of a signal in the antenna coils and amplifiers 42 at steps 120 and 122 and the signal detection circuits 36 at step 124, then electrical circuit assembly 16 will pass the BIT for those circuits. The electro-magnetic field pulse generated by the transformer is sufficient to provide a magnetic field that is detectable by antenna coils and amplifiers 42 and the signal detection circuitry 36 responds by providing an indication to microprocessor 30 of the detection of the pulse. Alternatively, the electro-magnetic field may be generated by other devices including a separate transmission circuit specifically designed for this purpose.

RF receiver 40 and demodulator 38 are tested in steps 126 and 128. RF receiver 40 may be a narrow-band FM receiver with separate data demodulator circuitry 38. Microprocessor 30 controls the power to receiver circuitry 40, which may be off, unless activated. The test of receiver circuitry 40 is performed when microprocessor 30 briefly powers receiver circuitry 40 at step 126. Microprocessor 30 monitors the output of data demodulator 38 and if microprocessor 30 detects the presence of a signal at an output of demodulator 38 the BIT for this circuitry passes. In this approach the output of demodulator circuitry 38 is random data and the presence of this random data constitutes a properly functioning receiver circuit 40 and demodulator 38. Alternatively, an RF signal may be generated by a separate transmission circuit specifically for the purpose of transmitting valid data for further confirmation of a properly functioning RF receiver 40 and demodulator 38.

At the completion of the testing of the various circuitry within electrical circuit assembly 16, microprocessor 30 determines if the tests have passed or failed and provides an indication to the user of the results of the BIT. A determination is made at step 130 and if electrical circuit assembly 16 has passed BIT, LED 18 will light up for a predetermined time, such as five seconds at the color determined by the measured battery capacity as determined at steps 108 and 110. LED 18 is activated for a predetermined time at step 136 and then it goes off. If electrical circuit assembly 16 fails any of the built-in-tests LED 18 is continuously red for a predetermined time and/or an alarm is on for a predetermined time at step 132, such as twenty seconds. At step 134 microprocessor 30 then inhibits any further operation of the collar functions. Alternatively, microprocessor 30 may provide further indications and/or diagnostics of the specific BIT, which resulted in the failure test indication. Additionally, microprocessor 30 may inhibit only the operation of the failed function or provide a pass/fail indication without inhibiting any failed functions.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A built-in circuitry testing system, comprising:
 a housing adapted to be carried by an animal;
 an electrical circuit enclosed in said housing;
 an electrical processing circuit enclosed in said housing, said electrical processing circuit including a built-in-test circuit electrically connected to said electrical circuit; and
 an indicator disposed at said housing and electrically connected to said built-in-test circuit, said indicator activated if said built-in-test circuit detects a problem with said electrical circuit.

2. The built-in circuitry testing system of claim 1, wherein said electrical processing circuit includes said built-in-test circuit in the form of at least one algorithm.

3. The built-in circuitry testing system of claim 1, wherein said indicator is at least one of a visual indicator and an audio indicator.

4. The built-in circuitry testing system of claim 1, wherein said electrical circuit includes a high voltage circuit and a receiver circuit.

5. The built-in circuitry testing system of claim 4, wherein said high voltage circuit is activated to produce an output pulse that is detected by said receiver circuit.

6. The built-in circuitry testing system of claim 5, wherein said output pulse is of a predetermined duration, said built-in-test circuit determining if a said receiver circuit detects said output pulse.

7. The built-in circuitry testing system of claim 1, further comprising a circuit that inhibits at least one function of said electrical circuit if said built-in-test circuit detects a problem with said electrical circuit.

8. The built-in circuitry testing system of claim 7, wherein said electrical circuit is a battery circuit with a voltage of said battery being tested by said built-in-test-circuit.

9. The built-in circuitry testing system of claim 8, further comprising an indicator that has a visual output that is dependent upon said voltage.

10. The built-in circuitry testing system of claim 9, wherein said visual output is at least one of changing a color of said visual output, changing a duration of said visual output and blinking said visual output.

11. The built-in circuitry testing system of claim 1, further comprising an indicator that has a visual output of an emission of light for a predetermined time period if said built-in-test circuit detects that said electrical circuit is functional.

12. The built-in circuitry testing system of claim 11, further comprising:
- a battery that powers said electrical circuit; and
- a battery charging circuit that is removably electrically connected to said battery, said built-in-test circuit being prompted to test said electrical circuit by a removal of said battery charging circuit.

* * * * *